US012157790B2

(12) United States Patent
Meisenheimer et al.

(10) Patent No.: US 12,157,790 B2
(45) Date of Patent: Dec. 3, 2024

(54) COMPOSITE MATERIALS BASED ON DUAL-CURE URETHANE POLYMERS AND DUAL-CURE ISOCYANURATE POLYMERS

(71) Applicant: Covestro Intellectual Property GmbH & Co. KG, Leverkusen (DE)

(72) Inventors: Richard Meisenheimer, Cologne (DE); Paul Heinz, Leverkusen (DE); Dirk Achten, Leverkusen (DE); Heiko Hocke, Leverkusen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 631 days.

(21) Appl. No.: 17/416,129

(22) PCT Filed: Jan. 20, 2020

(86) PCT No.: PCT/EP2020/051291
§ 371 (c)(1),
(2) Date: Jun. 18, 2021

(87) PCT Pub. No.: WO2020/152107
PCT Pub. Date: Jul. 30, 2020

(65) Prior Publication Data
US 2022/0041792 A1 Feb. 10, 2022

(30) Foreign Application Priority Data

Jan. 22, 2019 (EP) ..................................... 19153071
Feb. 1, 2019 (LU) ......................................... 101113

(51) Int. Cl.
| | |
|---|---|
| *C08G 18/72* | (2006.01) |
| *C08G 18/22* | (2006.01) |
| *C08G 18/24* | (2006.01) |
| *C08G 18/32* | (2006.01) |
| *C08G 18/48* | (2006.01) |
| *C08G 18/66* | (2006.01) |
| *C08G 18/73* | (2006.01) |
| *C08G 18/75* | (2006.01) |
| *C08J 5/24* | (2006.01) |

(52) U.S. Cl.
CPC ......... *C08G 18/722* (2013.01); *C08G 18/225* (2013.01); *C08G 18/246* (2013.01); *C08G 18/3206* (2013.01); *C08G 18/4833* (2013.01); *C08G 18/6677* (2013.01); *C08G 18/73* (2013.01); *C08G 18/755* (2013.01); *C08J 5/244* (2021.05); *C08J 2375/08* (2013.01)

(58) Field of Classification Search
CPC . C08J 5/24; C08G 18/72; C08G 18/73; C08G 18/75; C08G 18/48; C08G 18/32; C08G 18/66; C08G 18/22; C08G 18/24
USPC ...................................................... 523/222
See application file for complete search history.

(56) References Cited

U.S. PATENT DOCUMENTS

| | | | |
|---|---|---|---|
| 3,487,080 | A | 12/1969 | Yutaka et al. |
| 3,996,223 | A | 12/1976 | Gupta et al. |
| 4,026,840 | A | 5/1977 | Bechara et al. |
| 4,040,992 | A | 8/1977 | Bechara et al. |
| 4,255,569 | A | 3/1981 | Mueller et al. |
| 4,265,798 | A | 5/1981 | Mishra |
| 4,379,905 | A | 4/1983 | Stemmler et al. |
| 4,419,513 | A | 12/1983 | Breidenbach et al. |
| 4,487,928 | A | 12/1984 | Richter et al. |
| 4,499,253 | A | 2/1985 | Kerimis et al. |
| 4,604,418 | A | 8/1986 | Shindo et al. |
| 4,789,705 | A | 12/1988 | Kase et al. |
| 4,837,359 | A | 6/1989 | Woynar et al. |
| 4,960,848 | A | 10/1990 | Scholl et al. |
| 4,994,541 | A | 2/1991 | Dell et al. |
| 5,013,838 | A | 5/1991 | Scholl |
| 5,064,960 | A | 11/1991 | Pedain et al. |
| 5,076,958 | A | 12/1991 | Pedain et al. |
| 5,214,076 | A | 5/1993 | Tideswell et al. |
| 5,296,516 | A | 3/1994 | Krueger et al. |
| 5,489,663 | A | 2/1996 | Brandt et al. |
| 5,914,383 | A | 6/1999 | Richter et al. |
| 6,107,484 | A | 8/2000 | Richter et al. |
| 6,207,725 | B1 | 3/2001 | Sieker et al. |
| 6,613,863 | B2 | 9/2003 | Kohlstruk et al. |
| 6,635,761 | B1 | 10/2003 | Revelant et al. |
| 7,091,341 | B2 | 8/2006 | Revelant et al. |
| 8,742,166 | B2 | 6/2014 | Lucas et al. |
| 9,926,402 | B2 | 3/2018 | Laas et al. |
| 2006/0155095 | A1 | 7/2006 | Daussin et al. |
| 2008/0234402 | A1 | 9/2008 | Lehmann et al. |
| 2010/0087560 | A1 | 4/2010 | Crain et al. |
| 2015/0051301 | A1 | 2/2015 | Schleiermacher et al. |

(Continued)

FOREIGN PATENT DOCUMENTS

| | | |
|---|---|---|
| CA | 2034622 A1 | 8/1991 |
| CA | 2139535 A1 | 8/1995 |

(Continued)

OTHER PUBLICATIONS

J. PraktChem. 336 (1994), pp. 185-200.
Justus Liebigs Annalen der Chemie, vol. 562 (1949) p. 75-136.
European Polymer Journal, vol. 16, 147-148 (1979).
J. H. Saunders and K. C. Frisch, Polyurethanes Chemistry and Technology, p. 94 ff (1962).

(Continued)

*Primary Examiner* — Deve V Hall
(74) *Attorney, Agent, or Firm* — The Webb Law Firm

(57) ABSTRACT

The invention relates to reaction mixtures having a high ratio of isocyanate groups to isocyanate-reactive groups, which reaction mixtures mostly cure through the formation of isocyanurate groups, and to the use of such reaction mixtures for producing semifinished materials.

16 Claims, No Drawings

(56) References Cited

U.S. PATENT DOCUMENTS

| | | |
|---|---|---|
| 2016/0288377 A1 | 10/2016 | Passmann et al. |
| 2017/0198082 A1 | 7/2017 | Verbeke et al. |
| 2019/0144592 A1 | 5/2019 | Hocke et al. |
| 2019/0144593 A1 | 5/2019 | Hocke et al. |

FOREIGN PATENT DOCUMENTS

| | | | |
|---|---|---|---|
| CA | 2244486 A1 | 2/1999 | |
| CN | 105968302 A | 9/2016 | |
| DE | 2414413 A1 | 10/1975 | |
| DE | 3240613 A1 | 5/1984 | |
| EP | 0013880 A1 | 8/1980 | |
| EP | 0100129 A1 | 2/1984 | |
| GB | 809809 A | 3/1959 | |
| GB | 1145952 A | 3/1969 | |
| GB | 1244416 A | 9/1971 | |
| GB | 1386399 A | 3/1975 | |
| GB | 1391066 A | 4/1975 | |
| GB | 2221465 A | 2/1990 | |
| GB | 2222161 A | 2/1990 | |
| WO | 2004009687 A1 | 1/2004 | |
| WO | WO-2016170058 A1 * | 10/2016 | ........... C07D 251/34 |

OTHER PUBLICATIONS

International Search Report, PCT/EP2020/051291, date of mailing: Mar. 11, 2020, Authorized officer: Martin Bergmeier.

* cited by examiner

COMPOSITE MATERIALS BASED ON DUAL-CURE URETHANE POLYMERS AND DUAL-CURE ISOCYANURATE POLYMERS

CROSS-REFERENCE TO RELATED APPLICATION

This application is a national stage application under 35 U.S.C. § 371 of PCT/EP2020/051291, filed Jan. 20, 2020, which claims the benefit of European Application No. 19153071.6, filed Jan. 22, 2019, and Luxembourg Application No. LU101113, filed Feb. 1, 2019, each of which is incorporated herein by reference.

FIELD

The present invention relates to reaction mixtures having a high ratio of isocyanate groups to isocyanate-reactive groups which cure predominantly through formation of isocyanurate groups, and to the use of such reaction mixtures for producing semifinished products.

BACKGROUND

The production of composite materials having an isocyanurate matrix has previously been described in the prior art in WO 2017/191175 or WO 2017/191216. However, these materials are obtained in a process wherein the filler is mixed with a polyisocyanate composition and said polyisocyanate composition is directly cured to afford a polyisocyanurate plastic in a single process step.

This process does not make it possible to obtain semifinished products which after a first curing step of the polyisocyanate composition are storage-stable and transportable but are nevertheless further processable, for example by forming, and obtain their final mechanical properties only subsequently in a second curing step.

US 2010/0087560 and WO 2007/025888 describe the production of polyisocyanurate foams from mixtures of polyisocyanates and polyols having a high index. Quaternary amines and sodium salts of carboxylic acids were used as catalysts. Two-stage curing, which via a urethanization reaction initially affords a preliminary product which is subjected to final curing only in a separate second process step to form isocyanurate groups, is not disclosed.

SUMMARY

The present invention therefore relates to a two-stage process wherein a polyisocyanate composition having a molar excess of isocyanate-reactive groups is applied to a fiber and in a first process step is pre-cured to achieve a viscosity increase, preferably through formation of urethane, urea or thiourethane groups. In the first process step the reaction of (i) isocyanate groups with isocyanate groups proceeds in a ratio relative to the reaction of (ii) isocyanate groups with isocyanate-reactive groups of at most 1:1, preferably at most 1:2 and particularly preferably at most 1:3. This makes it possible to obtain a semifinished product which may be easily further processed, stored and transported. In a further process step the polyisocyanate composition is subjected to final curing predominantly by reaction of isocyanate groups with other isocyanate groups, preferably to form uretdione groups, asymmetric trimers and isocyanurate groups, particularly preferably to form isocyanurate groups.

DETAILED DESCRIPTION

The production of such a semifinished product requires reaction mixtures containing specific reactive components and catalysts adapted to the two-stage process. In a first embodiment, the present invention therefore relates to a reaction mixture having a molar ratio of isocyanate groups to isocyanate-reactive groups of 2:1 to 10:1 containing a) a polyisocyanate composition A having a proportion of aliphatically and cycloaliphatically bonded isocyanate groups based on the total amount of isocyanate groups present of at least 80 mol %;
b) an isocyanate-reactive component B;
c) at least one catalytic functionality C1 which catalyzes the reaction of isocyanate groups with isocyanate-reactive groups; and
d) at least one catalytic functionality C2 which catalyzes the reaction of isocyanate groups to afford isocyanurate groups, wherein the catalytic functionalities C1 and C2 are brought about by the same compound or by at least two different compounds.

The molar ratio of isocyanate groups to isocyanate-reactive groups is preferably between 3:1 and 9:1 and particularly preferably between 4:1 and 9:1. "Isocyanate-reactive groups" in the context of the present application are preferably hydroxyl, amino and thiol groups. Even when isocyanate groups are capable of undergoing crosslinking reactions with other isocyanate groups, isocyanate groups are not referred to as "isocyanate-reactive groups" in the present application.

It is preferable when after storage for 24 hours at a temperature of up to 23° C. the reaction mixture has a viscosity of at least 100 Pas or a modulus G' of at least $5*10^3$ Pa.

The reaction mixture according to the invention is not intended for the production of rigid or flexible foams. It therefore contains physical and chemical blowing agents at most in an amount which relative to a reaction mixture without blowing agent reduces the density of the resulting polymer by at least 10%, more preferably by at least 15% and particularly preferably by at least 20%.

The maximum content of physical and chemical blowing agents in the reaction mixture is therefore preferably at most 1% by weight, more preferably at most 0.5% by weight and most preferably at most 0.1% by weight, in each case based on the total amount of the reaction mixture.

Blowing agents are to be understood as meaning constituents which undergo reaction or vaporization to form gas bubbles during the selected reaction conditions.

The reaction mixture is produced by mixing the components defined above. All methods known to those skilled in the art may be employed here.

Polyisocyanate Composition A

"Polyisocyanate composition A" in the context of the invention refers to the isocyanate component in the initial reaction mixture. In other words, this is the sum total of all compounds in the initial reaction mixture that have isocyanate groups. The polyisocyanate composition A is thus used as reactant in the process of the invention.

The term "polyisocyanate" as used here is a collective term for compounds containing two or more isocyanate groups (this is understood by the person skilled in the art to mean free isocyanate groups of the general structure —N=C=O) in the molecule. The simplest and most important representatives of these polyisocyanates are the diisocyanates. These have the general structure O═C═N—R—N═C═O, where R typically represents aliphatic, alicyclic and/or aromatic radicals.

Because of the polyfunctionality (>2 isocyanate groups), it is possible to use polyisocyanates to produce a multitude of polymers (e.g. polyurethanes, polyureas and polyisocyanurates) and oligomeric compounds (for example those having urethane, urea, uretdione, isocyanurate, allophanate, biuret, iminooxadiazinedione and/or oxadiazinetrione structure).

Where reference is made here to "polyisocyanates" in general terms, this means monomeric and/or oligomeric polyisocyanates alike. For the understanding of many aspects of the invention, however, it is important to distinguish between monomeric diisocyanates and oligomeric polyisocyanates. Where reference is made here to "oligomeric polyisocyanates", this then means polyisocyanates formed from at least two monomeric diisocyanate molecules, i.e. compounds that contain or consist of a reaction product of at least two monomeric diisocyanate molecules.

The production of oligomeric polyisocyanates from monomeric diisocyanates is here also referred to as modification of monomeric diisocyanates. This "modification" as used here means the reaction of monomeric diisocyanates to give oligomeric polyisocyanates having urethane, urea, uretdione, isocyanurate, allophanate, biuret, iminooxadiazinedione and/or oxadiazinetrione structure.

For example, hexamethylene diisocyanate (HDI) is a "monomeric diisocyanate" since it contains two isocyanate groups and is not a reaction product of at least two polyisocyanate molecules:

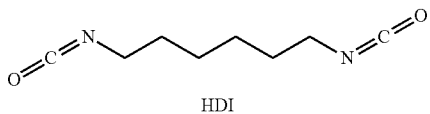
HDI

By contrast, reaction products of at least two HDI molecules which still have at least two isocyanate groups are "oligomeric polyisocyanates" in the context of the invention. Proceeding from monomeric HDI, representatives of such "oligomeric polyisocyanates" include for example HDI isocyanurate and HDI biuret which are each constructed from three monomeric HDI units:

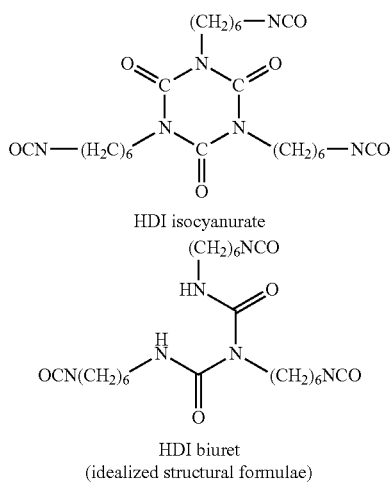
HDI isocyanurate

HDI biuret
(idealized structural formulae)

In one embodiment of the invention, the polyisocyanate composition A contains monomeric and/or oligomeric polyisocyanates. In a further embodiment of the invention, the polyisocyanate composition A consists entirely or to an extent of at least 25%, 40%, 60%, 80%, 85%, 90%, 95%, 98%, 99% or 99.5% by weight, based in each case on the weight of the polyisocyanate composition A, of monomeric polyisocyanates. Mixtures of monomeric and oligomeric polyisocyanates can be used particularly advantageously in order to adjust the viscosity of the polyisocyanate composition A. The monomeric polyisocyanates may be used here as reactive diluents in order to lower the viscosity of the oligomeric polyisocyanates.

In an alternative embodiment of the invention, the polyisocyanate composition A used as reactant in the crosslinking contains predominantly oligomeric polyisocyanates and is low in monomeric polyisocyanates. In one embodiment of the invention, the polyisocyanate composition A consists entirely or to an extent of at least 25%, 40%, 60%, 80%, 85%, 90%, 95%, 98%, 99% or 99.5% by weight, based in each case on the weight of the polyisocyanate composition A, of oligomeric polyisocyanates. This content of oligomeric polyisocyanates is based on the polyisocyanate composition A, meaning that they are not formed, for instance, as intermediate during the process of the invention, but are already present in the polyisocyanate composition A used as reactant on commencement of the reaction.

"Low in monomers" and "low in monomeric polyisocyanates" is used here synonymously in relation to the polyisocyanate composition A.

Since monomeric polyisocyanates are volatile, it may be advantageous for reasons of operational safety when the polyisocyanate composition A has a proportion of monomeric polyisocyanates in the polyisocyanate composition A of not more than 20% by weight, especially not more than 15% by weight or not more than 10% by weight, based in each case on the weight of the polyisocyanate composition A. Preferably, the polyisocyanate composition A has a content of monomeric polyisocyanates of not more than 5% by weight, preferably not more than 2.0% by weight, particularly preferably not more than 1.0% by weight, based in each case on the weight of the polyisocyanate composition A. Particularly good results are established when the polymer composition A is essentially free of monomeric polyisocyanates. "Essentially free" means here that the content of monomeric polyisocyanates is not more than 0.3% by weight, preferably not more than 0.1% by weight, based on the weight of the polyisocyanate composition A.

Low-monomer polyisocyanate compositions A can be obtained in that the modification of a monomeric starting isocyanate is followed by a further process step for removal of the unconverted excess monomeric polyisocyanates. This removal of monomers can be effected in a manner of particular practical relevance by methods known per se, preferably by thin-film distillation under high vacuum or by extraction with suitable solvents that are inert toward isocyanate groups, for example aliphatic or cycloaliphatic hydrocarbons such as pentane, hexane, heptane, cyclopentane or cyclohexane.

In one embodiment of the invention, the polyisocyanate composition A of the invention is obtained by modifying monomeric polyisocyanates with subsequent removal of unconverted monomers. It is thus low in monomers.

In a further particular embodiment of the invention, the polyisocyanate composition A may contain a mixture of various isocyanates. Blending of isocyanates can be advantageous for achieving specific technical effects, for example a particular hardness or glass transition temperature (Tg). Results of particular practical relevance are established when the polyisocyanate composition A has a proportion of monomeric diisocyanates in the polyisocyanate composition A of not more than 45% by weight, especially not more than 15% by weight or not more than 10% by weight, based in each case on the weight of the polyisocyanate composition A. Preferably, the polyisocyanate composition A has a content of monomeric diisocyanate of not more than 5% by weight, especially not more than 2.0% by weight, particularly preferably not more than 1.0% by weight, based in each case on the weight of the polyisocyanate composition A.

In a further embodiment of the process of the invention, the polyisocyanate composition A has a proportion of reactive isocyanate groups in the monomeric diisocyanate, based on the total number of all reactive isocyanate groups in the polyisocyanate composition A, of not more than 45%, especially not more than 25% or not more than 10%. Preferably, the polyisocyanate composition A has a content of monomeric diisocyanate groups of not more than 5%, preferably not more than 2.0%, particularly preferably not more than 1.0%, based in each case on the total number of all reactive isocyanate groups in the polyisocyanate composition A.

In a further particular embodiment of the process of the invention, the polyisocyanate composition A may contain monomeric monoisocyanates or monomeric polyisocyanates having an isocyanate functionality greater than two or less than two, i.e. having more than two or less than two isocyanate groups per molecule. The addition of monomeric monoisocyanates has proven advantageous for influencing the network density of the resulting material. Results of particular practical relevance are established when the polyisocyanate composition A has a proportion of monomeric monoisocyanates or monomeric isocyanates having an isocyanate functionality of less than two in the polyisocyanate composition A of less than 50% by weight, especially less than 15% by weight or less than 10% by weight, based in each case on the weight of the polyisocyanate composition A. Preferably, the polyisocyanate composition A has a content of monomeric monoisocyanates or monomeric isocyanates having an isocyanate functionality of less than two of not more than 5% by weight, preferably not more than 2.0% by weight, particularly preferably not more than 1.0% by weight, based in each case on the weight of the polyisocyanate composition A.

The oligomeric polyisocyanates described here are typically obtained by modifying simple aliphatic, cycloaliphatic, araliphatic and/or aromatic monomeric diisocyanates or mixtures of such monomeric diisocyanates.

According to the invention, the oligomeric polyisocyanates may in particular have urethane, urea, uretdione, isocyanurate, allophanate, biuret, iminooxadiazinedione and/or oxadiazinetrione structure. In one embodiment of the invention, the oligomeric polyisocyanates have at least one of the following oligomeric structure types or mixtures thereof:

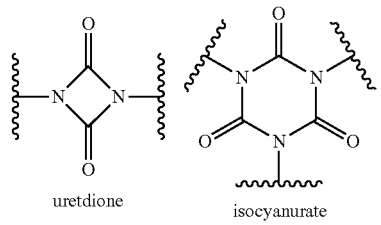

uretdione
isocyanurate

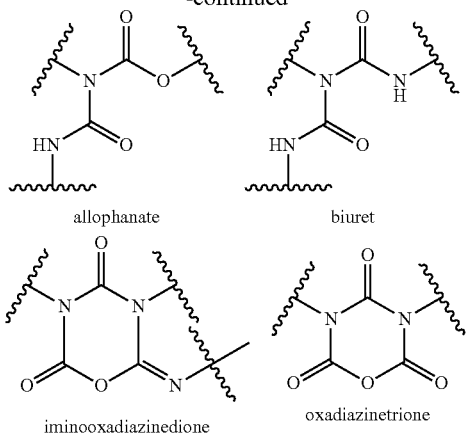

allophanate
biuret iminooxadiazinedione
oxadiazinetrione

It has been found that, surprisingly, it can be advantageous to use oligomeric polyisocyanates that are a mixture of at least two oligomeric polyisocyanates, wherein the at least two oligomeric polyisocyanates differ in terms of their structure. This structure is preferably selected from the group consisting of urethane, urea, uretdione, isocyanurate, allophanate, biuret, iminooxadiazinedione and oxadiazinetrione structures, and mixtures thereof. Starting mixtures of this kind can especially lead, by comparison with trimerization reactions with oligomeric polyisocyanates of just one defined structure, to an effect on the Tg value and mechanical values such as hardness, scratch resistance, or gloss and tactile properties, which is advantageous for many applications.

Preference is given to using, in the process of the invention, a polyisocyanate composition A consisting of at least one oligomeric polyisocyanate having urethane, urea, biuret, allophanate, isocyanurate and/or iminooxadiazinedione structure and mixtures thereof.

In another embodiment, the polyisocyanate composition A containing oligomeric polyisocyanates is one containing only a single defined oligomeric structure, for example exclusively or for the most part an isocyanurate structure. In the context of the present invention, a polyisocyanate composition A is regarded as a polyisocyanate composition of a single defined oligomeric structure when an oligomeric structure selected from urethane, urea, uretdione, isocyanurate, allophanate, biuret, iminooxadiazinedione and/or oxadiazinetrione structures is present to an extent of at least 50 mol %, preferably 60 mol %, preferably 70 mol %, particularly preferably 80 mol %, in particular 90 mol %, based in each case on the sum total of the oligomeric structures from the group consisting of urethane, urea, uretdione, isocyanurate, allophanate, biuret, iminooxadiazinedione and oxadiazinetrione structures present in the polyisocyanate composition A.

In a further embodiment, the oligomeric polyisocyanates are those which have mainly isocyanurate structures and which may contain the abovementioned urethane, urea, uretdione, allophanate, biuret, iminooxadiazinedione and/or oxadiazinetrione structure only as by-products. Thus, one embodiment of the invention envisages the use of a polymer composition A of a single defined oligomeric structure, the oligomeric structure being an isocyanurate structure and being present to an extent of at least 50 mol %, preferably 60 mol %, preferably 70 mol %, particularly preferably 80 mol %, in particular 90 mol %, based in each case on the sum total of the oligomeric structures from the group consisting of urethane, urea, uretdione, isocyanurate, allophanate, biuret, iminooxadiazinedione and oxadiazinetrione structures present in the polyisocyanate composition A.

It is likewise possible in accordance with the invention to use oligomeric polyisocyanates having very substantially no isocyanurate structure, and containing mainly at least one of the abovementioned urethane, urea, uretdione, allophanate, biuret, iminooxadiazinedione and/or oxadiazinetrione structure types. In a particular embodiment of the invention, the polyisocyanate composition A consists to an extent of 50 mol %, preferably 60 mol %, preferably 70 mol %, particularly preferably 80 mol %, in particular 90 mol %, based in each case on the sum total of the oligomeric structures from the group consisting of urethane, urea, uretdione, isocyanurate, allophanate, biuret, iminooxadiazinedione and oxadiazinetrione structures present in the polyisocyanate composition A, of oligomeric polyisocyanates having a structure type selected from the group consisting of urethane, urea, uretdione, allophanate, biuret, iminooxadiazinedione and/or oxadiazinetrione structures.

A further embodiment of the invention envisages the use of a low-isocyanurate polyisocyanate composition A having, based on the sum total of the oligomeric structures from the group consisting of urethane, urea, uretdione, isocyanurate, allophanate, biuret, iminooxadiazinedione and oxadiazinetrione structures present in the polyisocyanate composition A, less than 50 mol %, preferably less than 40 mol %, more preferably less than 30 mol % and particularly preferably less than 20 mol %, 10 mol % or 5 mol % of isocyanurate structures.

A further embodiment of the invention envisages the use of a polymer composition A of a single defined oligomeric structure type, said oligomeric structure type being selected from the group consisting of urethane, urea, uretdione, allophanate, biuret, iminooxadiazinedione and/or oxadiazinetrione structures and this structure type being present to an extent of at least 50 mol %, preferably 60 mol %, more preferably 70 mol %, particularly preferably 80 mol %, in particular 90 mol %, based on the sum total of the oligomeric structures from the group consisting of urethane, urea, uretdione, isocyanurate, allophanate, biuret, iminooxadiazinedione and oxadiazinetrione structures present in the polyisocyanate composition A.

The proportions of urethane, urea, uretdione, isocyanurate, allophanate, biuret, iminooxadiazinedione and/or oxadiazinetrione structure in the polyisocyanate composition A may be determined, for example, by NMR spectroscopy. Preferably employable here is $^{13}$C NMR spectroscopy, preferably in proton-decoupled form, since the recited oligomeric structures give characteristic signals.

Irrespective of the underlying oligomeric structure type (urethane, urea, uretdione, isocyanurate, allophanate, biuret, iminooxadiazinedione and/or oxadiazinetrione structure), the polyisocyanate composition A for use in the process of the invention preferably has an (average) NCO functionality of 1.3 to 10.0, preferably of 2.0 to 5.0, more preferably of 2.3 to 4.5.

Results of particular practical relevance are obtained when the polyisocyanate composition A to be used in accordance with the invention has a content of isocyanate groups of 1.0% to 60.0% by weight. It has been found to be of particular practical relevance when the polyisocyanate composition A of the invention has a content of isocyanate groups of 8.0% to 50.0% by weight, preferably of 14.0% to 30.0% by weight, based in each case on the weight of the polyisocyanate composition A.

Production processes for oligomeric polyisocyanates having urethane, urea, uretdione, isocyanurate, allophanate, biuret, iminooxadiazinedione and/or oxadiazinetrione structure are described for example in J. PraktChem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299.

In an additional or alternative embodiment of the invention, the polyisocyanate composition A is defined in that it contains oligomeric polyisocyanates which have been obtained from monomeric polyisocyanates, irrespective of the nature of the modification reaction used, with observation of an oligomerization level of 5% to 45%, preferably 10% to 40%, particularly preferably 15% to 30%. "Oligomerization level" is understood here to mean the percentage of isocyanate groups originally present in the starting mixture which are consumed during the production process to form urethane, urea, uretdione, isocyanurate, allophanate, biuret, iminooxadiazinedione and/or oxadiazinetrione structures.

Suitable monomeric polyisocyanates for the polyisocyanate composition A or starting compounds for the oligomeric polyisocyanates are any desired monomeric polyisocyanates obtainable in various ways, for example by phosgenation in the liquid or gas phase or by a phosgene-free route, for example by thermal urethane cleavage. Particularly good results are established when the monomeric polyisocyanates are monomeric diisocyanates. Preferred monomeric diisocyanates are those having a molecular weight in the range from 140 to 400 g/mol, having aliphatically, cycloaliphatically, araliphatically and/or aromatically bonded isocyanate groups, for example 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), polycyclic isomeric diisocyanatophenylmethanes, 1,5-diisocyanatonaphthalene and any desired mixtures of such diisocyanates. Further diisocyanates that are likewise suitable can additionally be found, for example, in *Justus Liebigs Annalen der Chemie, volume* 562 (1949) p. 75-136.

In addition, it is also possible in the process of the invention to use conventional prepolymers bearing aliphatic or aromatic isocyanate end groups, for example polyether, polyester or polycarbonate prepolymers bearing aliphatic or aromatic isocyanate end groups, as polyisocyanates in the polyisocyanate composition A.

Suitable monomeric monoisocyanates which can optionally be used in the polyisocyanate composition A are, for example, n-butyl isocyanate, n-amyl isocyanate, n-hexyl isocyanate, n-heptyl isocyanate, n-octyl isocyanate, undecyl isocyanate, dodecyl isocyanate, tetradecyl isocyanate, cetyl isocyanate, stearyl isocyanate, cyclopentyl isocyanate, cyclohexyl isocyanate, 3- or 4-methylcyclohexyl isocyanate, phenyl isocyanate, alkylphenyl isocyanate, naphthyl isocyanate or any desired mixtures of such monoisocyanates. Examples of monomeric isocyanates having an isocyanate functionality of greater than two that may optionally be added to the polyisocyanate composition A include 4-isocyanatomethyloctane 1,8-diisocyanate (triisocyanatononane; TIN) or polycyclic derivatives of diphenylmethane diisocyanate (MDI), so-called polymeric MDI (pMDI) or crude MDI.

In one embodiment of the invention, the polyisocyanate composition A contains aromatic polyisocyanates. Preference is given to a content of aromatic polyisocyanates in the polyisocyanate composition A of not more than 70% by weight, especially not more than 30% by weight, not more than 20% by weight, not more than 10% by weight, not more than 5% by weight or not more than 1% by weight, based in each case on the weight of the polyisocyanate composition A, of aromatic polyisocyanates. As used here, "aromatic polyisocyanate" means a polyisocyanate having at least one aromatically bonded isocyanate group.

Aromatically bonded isocyanate groups are understood to mean isocyanate groups bonded to an aromatic hydrocarbyl radical.

In a preferred embodiment of the process of the invention, a polyisocyanate composition A including aliphatically and/or cycloaliphatically bonded isocyanate groups to an extent of at least 80 mol %, more preferably at least 95 mol %, based on the total amount of the isocyanate groups present in the polyisocyanate composition A, is used. More preferably, the polyisocyanate composition A in this embodiment includes exclusively aliphatically and/or cycloaliphatically bonded isocyanate groups.

Aliphatically and cycloaliphatically bonded isocyanate groups are respectively understood to mean isocyanate groups bonded to an aliphatic and cycloaliphatic hydrocarbyl radical.

In another preferred embodiment of the process of the invention, a polyisocyanate composition A consisting of or containing one or more oligomeric polyisocyanates is used, where the one or more oligomeric polyisocyanates has/have exclusively aliphatically and/or cycloaliphatically bonded isocyanate groups.

In another preferred embodiment of the process of the invention, a polyisocyanate composition A consisting of or containing one or more monomeric polyisocyanates is used, where the one or more monomeric polyisocyanates has/have exclusively aliphatically and/or cycloaliphatically bonded isocyanate groups.

In a further embodiment of the invention, the polyisocyanate composition A consists to an extent of at least 70%, 80%, 85%, 90%, 95%, 98% or 99% by weight, based in each case on the weight of the polyisocyanate composition A, of monomeric and/or oligomeric polyisocyanates having exclusively aliphatically and/or cycloaliphatically bonded isocyanate groups. Practical experiments have shown that particularly good results can be achieved with polyisocyanate compositions A) in which the oligomeric polyisocyanates present therein have exclusively aliphatically and/or cycloaliphatically bonded isocyanate groups.

In a particularly preferred embodiment of the process of the invention, a polyisocyanate composition A is used which consists of or contains one or more oligomeric polyisocyanates, where the one or more oligomeric polyisocyanates is/are formed on the basis of 1,4-diisocyanatobutane (BDI), 1,5-diisocyanatopentane (PDI), 1,6-diisocyanatohexane (HDI), isophorone diisocyanate (IPDI) or 4,4'-diisocyanatodicyclohexylmethane (H12MDI) or mixtures thereof.

In an alternative embodiment of the process of the invention, a polyisocyanate composition A containing one or more monomeric polyisocyanates selected from 1,4-diisocyanatobutane (BDI), 1,5-diisocyanatopentane (PDI), 1,6-diisocyanatohexane (HDI), isophorone diisocyanate (IPDI) or 4,4'-diisocyanatodicyclohexylmethane (H12MDI) or mixtures thereof is used.

Isocyanate-Reactive Component B

Compounds suitable as isocyanate-reactive component B in principle include any compound having at least 1, preferably on average at least 1.5 and particularly preferably at least 2 and less than 6 isocyanate-reactive groups as defined hereinabove in this application. Component B preferably has less than 5 and particularly preferably less than 4 isocyanate-reactive groups. The "isocyanate-reactive groups" of component B are preferably hydroxyl groups.

Component B may be a monomer but may also itself already be an oligomer or polymer. Said component preferably has a number-average molecular weight of at most 21 000 g/mol, more preferably at most 10 000 g/mol, yet more preferably at most 2500 g/mol and most preferably at most 300 g/mol. It is preferred here if its molecular weight is at least 60 g/mol.

In a preferred embodiment of the present invention, the employed component B is an alcohol having an average OH functionality of at least 2, preferably 3, and an OH content of at least 25% by weight. It is also possible to use a mixture of 2, 3 or more polyols when each of the employed polyols meets the abovementioned conditions. The use of polyols having a high OH functionality increases the network density of the resulting polymer and enhances properties such as for example the glass transition temperature, hardness, resistance to chemicals and weathering resistance. Preferred polyols B that meet these conditions are selected from the list consisting of glycol, glycerol, propanediol, butanediol, diethylene glycol, 1,2,10-decanetriol, 1,2,8-octanetriol, 1,2,3-trihydroxybenzene, 1,1,1-trimethylolpropane, 1,1,1-trimethylolethane, pentaerythritol and sugar alcohols. The polyol B is preferably a mixture containing at least 80% by weight of glycerol. The polyol B is more preferably a mixture containing at least 90% by weight of glycerol.

The composition of the reaction mixture cured in process step c) is preferably chosen such that the above-defined polyols to be used according to the invention contain at least 90 mol %, more preferably at least 95 mol % and yet more preferably 98 mol % of the isocyanate-reactive groups present in the reaction mixture. In this application the term "isocyanate-reactive groups" is to be understood as meaning hydroxyl, thiol, carboxyl and amino groups, amides, urethanes, acid anhydrides and epoxides. This means that according to the invention the presence of further compounds bearing isocyanate-reactive groups is indeed possible but quantitatively limited. It is especially preferable when the proportion of the isocyanate-reactive groups present in polymeric polyols does not exceed 9 mol %, more preferably 5 mol % and yet more preferably 2 mol %. It is very particularly preferable when the reaction mixture is free from polymeric polyols. In this application, the term "polymeric polyols" is to be understood as meaning OH-functional compounds having a number-average molecular weight Mn of at least 2000, preferably at least 10 000 and particularly preferably at least 20 000.

Catalytic Functionalities C1 and C2

It is essential to the invention that the reaction mixture contains one or more compounds having different catalytic functions. The first catalytic function is the promotion of the reaction of isocyanate groups with isocyanate-reactive groups, referred to in the present application as functionality C1. This preferably forms urethane or urea groups. The second catalytic function, referred to as C2 in the present application, is the promotion of the trimerization and/or dimerization of isocyanate groups to afford at least one structure selected from the group consisting of isocyanurate groups, iminooxadiazinedione and uretdione groups. The functionality C2 preferably catalyzes the trimerization of isocyanate groups to afford isocyanurate groups.

It is likewise essential to the invention that the reaction of isocyanate groups with isocyanate-reactive groups can proceed separately from the trimerization of isocyanate groups to afford isocyanurate groups. Functionality C2 must therefore be largely inactive at a temperature at which the functionality C1 is already active. This makes it possible in a first process step to stabilize the reaction mixture applied to a surface to such an extent that the resulting semifinished product is storable and transportable before final curing of the reaction mixture is achieved by activation of the functionality C2 at elevated temperature.

The type and amount of the employed catalytic functionalities C1 and C2 is therefore such that at a given temperature in the temperature range between 10° C. and 50° C. the reaction of isocyanate groups to afford urethane and urea groups proceeds at least twice as fast, preferably at least five times as fast, as all other reactions in which isocyanate is consumed, in particular the reaction of isocyanate groups to afford isocyanurate groups.

This is particularly preferably ensured by using catalytic functionalities having corresponding reaction rate coefficients. Relative to the catalytic functionality C2 the catalytic functionality C1 therefore has a reaction rate coefficient for the reaction of isocyanate groups $k(T)_{ISOC1}$ at any temperature in the range from 10° C. to 50° C. which is preferably at least twice as large as the reaction rate coefficient $k(T)_{ISOC2}$. A factor of at least 5 is more preferred and a factor of at least 10 is yet more preferred.

In a preferred embodiment of the present invention, the reaction mixture contains a compound comprising both catalytic functions C1 and C2. In another embodiment, the reaction mixture contains at least two different compounds of which the first compound catalyzes the reaction of isocyanate groups with isocyanate-reactive groups (functionality C1) and the second compound catalyzes the reaction of isocyanate groups with one another (functionality C2).

Catalysts which are particularly suitable according to the invention are described hereinbelow. However, based on the requirements defined hereinabove those skilled in the art are capable of identifying further compound having the functionalities C1 and/or C2 through routine experiments. Reaction rate coefficients can be ascertained by commonly known methods from the conversion rate of the isocyanate group at the desired reaction temperatures, optionally individually in solution. For this purpose, the reaction is observed by means of IR or NIR or NMR within a range up to max. 10% conversion, and the decrease in the isocyanate concentration is plotted against time at a given temperature.

Catalysts Having Functionalities C1 and C2

A particularly suitable compound having both a catalytic functionality C1 and a catalytic functionality C2 is a compound as defined in formula (I) or an adduct of a compound according to formula (I)

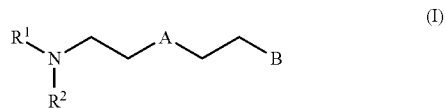

where $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl;

A is selected from the group consisting of O, S and $NR^3$, where $R^3$ is selected from the group consisting of hydrogen, methyl, ethyl, propyl, isopropyl, butyl and isobutyl; and B is selected independently of A from the group consisting of OH, SH, $NHR^4$ and $NH_2$, where $R^4$ is selected from the group consisting of methyl, ethyl and propyl.

In a preferred embodiment, A is $NR^3$, where $R^3$ is selected from the group consisting of hydrogen, methyl, ethyl, propyl, isopropyl, butyl and isobutyl. $R^3$ is preferably methyl or ethyl. $R^3$ is particularly preferably methyl.

In a first variant of this embodiment, B is OH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are particularly preferably methyl.

In a second variant of this embodiment, B is SH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are particularly preferably methyl.

In a third variant of this embodiment, B is $NHR^4$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are particularly preferably methyl. In this variant, R4 is selected from the group consisting of methyl, ethyl and propyl. Preferably, R4 is methyl or ethyl. R4 is particularly preferably methyl.

In a fourth variant of this embodiment, B is $NH_2$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are particularly preferably methyl.

In a further preferred embodiment, A is oxygen.

In a first variant of this embodiment, B is OH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are particularly preferably methyl.

In a second variant of this embodiment, B is SH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are particularly preferably methyl.

In a third variant of this embodiment, B is $NHR^4$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are particularly preferably methyl. In this variant, $R^4$ is selected from the group consisting of methyl, ethyl and propyl. Preferably, R4 is methyl or ethyl. R4 is particularly preferably methyl.

In a fourth variant of this embodiment, B is $NH_2$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are particularly preferably methyl.

In yet a further preferred embodiment, A is sulfur.

In a first variant of this embodiment, B is OH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are particularly preferably methyl.

In a second variant of this embodiment, B is SH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are particularly preferably methyl.

In a third variant of this embodiment, B is $NHR^4$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are particularly preferably methyl. In this variant, $R^4$ is selected from the group consisting of methyl, ethyl and propyl. Preferably, R4 is methyl or ethyl. R4 is particularly preferably methyl.

In a fourth variant of this embodiment, B is $NH_2$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are particularly preferably methyl.

Preferred adducts of a compound of formula (I) are adducts of said compound and a compound having at least one isocyanate group.

The umbrella term "adduct" is understood to mean urethane, thiourethane and urea adducts of a compound of formula (I) with a compound having at least one isocyanate group. A urethane adduct is particularly preferred. The adducts according to the invention are formed when an isocyanate reacts with the functional group B of the compound defined in formula (I). When B is a hydroxyl group a urethane adduct is formed. When B is a thiol group a thiourethane adduct is formed. And when B is $NH_2$ or $NHR^4$ a urea adduct is formed.

Catalyst Having Functionality C1

Catalysts C1 particularly suitable according to the invention are organometallics, preferably selected from the group consisting of dibutyltin diacetate, dibutyltin dilaurate (DBTL) and dibutyltin bisacetoacetonate. Tin carboxylates are likewise suitable. It is very particularly preferable when DBTL is employed as catalyst C1.

Catalyst Having Functionality C2

Suitable catalysts having a catalytic functionality C2 for the process according to the invention are for example simple tertiary amines, for example triethylamine, tributylamine, N,N-dimethylaniline, N-ethylpiperidine or N,N'-dimethylpiperazine. Suitable catalysts also include the tertiary hydroxyalkylamines described in GB 2 221 465, for example triethanolamine, N-methyldiethanolamine, dimethylethanolamine, N-isopropyldiethanolamine and 1-(2-hydroxyethyl)pyrrolidine, or the catalyst systems known from GB 2 222 161 that consist of mixtures of tertiary bicyclic amines, for example DBU, with simple aliphatic alcohols of low molecular weight.

A multiplicity of different metal compounds are likewise suitable for the process according to the invention as catalysts having a catalytic functionality C2. Suitable examples are the octoates and naphthenates of manganese, iron, cobalt, nickel, copper, zinc, zirconium, cerium or lead or mixtures thereof with acetates of lithium, sodium, potassium, calcium or barium that are described as catalysts in DE-A 3 240 613, the sodium and potassium salts of linear or branched alkanecarboxylic acids having up to 10 carbon atoms that are disclosed by DE-A 3 219 608, such as of propionic acid, butyric acid, valeric acid, caproic acid, heptanoic acid, caprylic acid, pelargonic acid, capric acid and undecyl acid, the alkali metal or alkaline earth metal salts of aliphatic, cycloaliphatic or aromatic mono- and polycarboxylic acids having 2 to 20 carbon atoms that are disclosed by EP-A 0 100 129, such as sodium benzoate or potassium benzoate, the alkali metal phenoxides disclosed by GB-A 1 391 066 and GB-A 1 386 399, such as sodium phenoxide or potassium phenoxide, the alkali metal and alkaline earth metal oxides, hydroxides, carbonates, alkoxides and phenoxides disclosed by GB 809 809, alkali metal salts of enolizable compounds and metal salts of weak aliphatic or cycloaliphatic carboxylic acids, such as sodium methoxide, sodium acetate, potassium acetate, sodium acetoacetate, lead 2-ethylhexanoate and lead naphthenate, the basic alkali metal compounds complexed with crown ethers or polyether alcohols that are disclosed by EP-A 0 056 158 and EP-A 0 056 159, such as complexed sodium carboxylates or potassium carboxylates, the pyrrolidinone potassium salt disclosed by EP-A 0 033 581, the mono- or polynuclear complex of titanium, zirconium and/or hafnium disclosed by application EP 13196508.9, such as zirconium tetra-n-butoxide, zirconium tetra-2-ethylhexanoate and zirconium tetra-2-ethylhexoxide, and tin compounds of the type described in *European Polymer Journal*, vol. 16, 147-148 (1979), such as dibutyltin dichloride, diphenyltin dichloride, triphenylstannanol, tributyltin acetate, tributyltin oxide, tin octoate, dibutyl(dimethoxy)stannane, and tributyltin imidazolate.

Further catalysts having a catalytic functionality C2 suitable for the process of the invention are, for example, the quaternary ammonium hydroxides known from DE-A 1 667 309, EP-A 0 013 880 and EP-A 0 047 452, for example tetraethylammonium hydroxide, trimethylbenzylammonium hydroxide, N,N-dimethyl-N-dodecyl-N-(2-hydroxyethyl) ammonium hydroxide, N-(2-hydroxyethyl)-N,N-dimethyl-N-(2,2'-dihydroxymethylbutyl)ammonium hydroxide and 1-(2-hydroxyethyl)-1,4-diazabicyclo[2.2.2]octane hydroxide (monoadduct of ethylene oxide and water onto 1,4-diazabicyclo[2.2.2]octane), the quaternary hydroxyalkylammonium hydroxides known from EP-A 37 65 or EP-A 10 589, for example N,N,N-trimethyl-N-(2-hydroxyethyl)ammonium hydroxide, the trialkylhydroxylalkylammonium carboxylates that are known from DE-A 2631733, EP-A 0 671 426, EP-A 1 599 526 and U.S. Pat. No. 4,789,705, for example N,N,N-trimethyl-N-2-hydroxypropylammonium p-tert-butylbenzoate and N,N,N-trimethyl-N-2-hydroxypropylammonium 2-ethylhexanoate, the quaternary benzylammonium carboxylates known from EP-A 1 229 016, for example N-benzyl-N,N-dimethyl-N-ethylammonium pivalate, N-benzyl-N,N-dimethyl-N-ethylammonium 2-ethylhexanoate, N-benzyl-N,N,N-tributylammonium 2-ethylhexanoate, N,N-dimethyl-N-ethyl-N-(4-methoxybenzyl)ammonium 2-ethylhexanoate or N,N,N-tributyl-N-(4-methoxybenzyl)ammonium pivalate, the tetrasubstituted ammonium α-hydroxycarboxylates known from WO 2005/087828, for example tetramethylammonium lactate, the quaternary ammonium or phosphonium fluorides known from EP-A 0 339 396, EP-A 0 379 914 and EP-A 0 443 167, for example N-methyl-N,N,N-trialkylammonium fluorides with $C_8$-$C_{10}$-alkyl radicals, N,N,N,N-tetra-n-butylammonium fluoride, N,N,N-trimethyl-N-benzylammonium fluoride, tetramethylphosphonium fluoride, tetraethylphosphonium fluoride or tetra-n-butylphosphonium fluoride, the quaternary ammonium and phosphonium polyfluorides known from EP-A 0 798 299, EP-A 0 896 009 and EP-A 0 962 455, for example benzyltrimethylammonium hydrogen polyfluoride, the tetraalkylammonium alkylcarbonates which are known from EP-A 0 668 271 and are obtainable by reaction of tertiary amines with dialkyl carbonates, or betaine-structured quaternary ammonioalkyl carbonates, the quaternary ammonium hydrogencarbonates known from WO 1999/023128, for example choline bicarbonate, the quaternary ammonium salts which are known from EP 0 102 482 and are obtainable from tertiary amines and alkylating esters of phosphorus acids, examples of such salts being reaction products of triethylamine, DABCO or N-methylmorpholine with dimethyl methanephosphonate, or the tetrasubstituted ammonium salts of lactams that are known from WO 2013/167404, for example trioctylammonium caprolactamate or dodecyltrimethylammonium caprolactamate.

Further catalysts suitable for the process according to the invention having a catalytic functionality C2 may be found, for example, in J. H. Saunders and K. C. Frisch, Polyurethanes Chemistry and Technology, pp. 94 ff(1962) and the literature cited therein.

Preferred catalysts having a catalytic functionality C2 are metal compounds of the abovementioned type, in particular carboxylates and alkoxides of alkali metals, alkaline earth metals, tin or zirconium and organotin compounds of the recited type.

Particularly preferred catalysts having a catalytic functionality C2 are tin, sodium and potassium salts of aliphatic carboxylic acids having 2 to 20 carbon atoms.

Very particularly preferred catalysts having a catalytic functionality C2 for the process according to the invention are potassium acetate and tin octoate.

"Catalyst" in the context of the invention is understood to mean the combination of active substance and suitable solvents, coactivators, reactive diluents, as employed in the examples.

In the process according to the invention, the catalyst having a catalytic functionality C2 is generally employed in a concentration based on the amount of the employed polyisocyanate composition A of 0.0005% to 15.0% by weight, preferably of 0.010% to 10.0% by weight and particularly preferably of 0.1% to 5.0% by weight.

In a preferred embodiment of the invention, the employed catalyst having a catalytic functionality C2 is at least one basic compound, in particular salts of carboxylic acids. It is especially also possible to employ mixtures of different basic compounds as catalysts having a catalytic functionality C2.

In a further preferred embodiment of the invention, the employed catalyst having a catalytic functionality C2 is at least one basic compound of the alkali or alkaline earth metals, in particular their salts of carboxylic acids such as potassium acetate, and a polyether. The polyether has at least 2, preferably at least 4, particularly preferably at least 6 and in particular at least 8 successive ethylene oxide units in the molecule.

In a particularly preferred embodiment of the present invention, the catalyst having a catalytic functionality C2 is a polyether having at least 2, preferably 4 and particularly preferably at least 6 successive ethylene oxide units in the molecule. Dissolved in this polyether is an alkaline potassium, lithium or sodium salt with a metal ion concentration between 0.01% by weight and 50% by weight, preferably between 0.1% by weight and 25% by weight, particularly preferably between 0.5% by weight and 15% by weight and in particular between 1% by weight and 10% by weight. Most preferred is a polyether having at least 7 successive ethylene oxide units in the molecule, in which at least a portion of the alkaline potassium salt is dissolved.

In the process according to the invention, when using basic salts of carboxylic acids the catalyst having a catalytic functionality C2 is generally employed in a concentration based on the amount of the employed polyisocyanate composition A) of 0.04% to 15.0% by weight, preferably of 0.10% to 8.0% by weight and particularly preferably of 0.5% to 5.0% by weight. Only the mixture of the at least one basic compound is regarded as catalyst for calculation of the concentration.

The catalysts having a catalytic functionality C2 may be employed in the process according to the invention both individually and in the form of any desired mixtures with one another.

The catalysts having the functionalities C1 and C2 employed in the process according to the invention are generally sufficiently soluble or dispersible in the polyisocyanate composition A in the amounts required for initiation of the crosslinking reaction. The catalysts are therefore preferably added to the polyisocyanate composition A as pure substance.

However, to improve their incorporability the catalysts having the catalytic functionalities C1 and C2 may also optionally be employed dissolved in a suitable organic solvent. Suitable solvents include all solvents that under the chosen reaction conditions do not adversely affect the activity of the catalysts, in particular do not undergo chemical reactions with the catalysts by which these are deactivated or "poisoned". The degree of dilution of the catalyst solutions is freely choosable within a very wide range.

Suitable catalyst solvents are, for example, solvents that are inert toward isocyanate groups, for example hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol ethyl and butyl ether acetate, propylene glycol monomethyl ether acetate, 1-methoxy-2-propyl acetate, 3-methoxy-n-butyl acetate, propylene glycol diacetate, acetone, methyl ethyl ketone, methyl isobutyl ketone, cyclohexanone, lactones, such as β-propiolactone, γ-butyrolactone, ε-caprolactone and ε-methylcaprolactone, but also solvents such as N-methylpyrrolidone and N-methylcaprolactam, 1,2-propylene carbonate, methylene chloride, dimethyl sulfoxide, triethyl phosphate or any desired mixtures of such solvents.

If catalyst solvents are used in the process of the invention, preference is given to using catalyst solvents which bear groups reactive toward isocyanates and can be incorporated into the polyisocyanurate plastic. Examples of such solvents are mono- or polyhydric simple alcohols, for example methanol, ethanol, n-propanol, isopropanol, n-butanol, n-hexanol, 2-ethyl-1-hexanol, ethylene glycol, propylene glycol, the isomeric butanediols, 2-ethylhexane-1,3-diol or glycerol; ether alcohols, for example 1-methoxy-2-propanol, 3-ethyl-3-hydroxymethyloxetane, tetrahydrofurfuryl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol, dipropylene glycol or else liquid higher molecular weight polyethylene glycols, polypropylene glycols, mixed polyethylene/polypropylene glycols and the monoalkyl ethers thereof; ester alcohols, for example ethylene glycol monoacetate, propylene glycol monolaurate, glycerol mono- and diacetate, glycerol monobutyrate or 2,2,4-trimethylpentane-1,3-diol monoisobutyrate; unsaturated alcohols, for example allyl alcohol, 1,1-dimethylallyl alcohol or oleyl alcohol; aralaphatic alcohols, for example benzyl alcohol; N-monosubstituted amides, for example N-methylformamide, N-methylacetamide, cyanoacetamide or 2-pyrrolidinone, or any desired mixtures of such solvents.
Fiber D In a preferred embodiment, the present invention relates to a fiber D which is wetted with the reaction mixture according to the invention.

The fiber employable according to the invention may be selected from all inorganic fibers, organic fibers, natural fibers or mixtures thereof known to those skilled in the art. Said fiber may contain further substances serving as sizes for example.

Preferred inorganic fibers are glass fibers, basalt fibers, boron fibers, ceramic fibers, whiskers, silica fibers and metallic reinforcing fibers. Preferred organic fibers are aramid fibers, carbon fibers, carbon nanotubes, polyester fibers, polyethylene fibers, nylon fibers and Plexiglass fibers. Preferred natural fibers are flax fibers, hemp fibers, wood fibers, cellulose fibers and sisal fibers.

According to the invention suitable fibers include all fibers having an aspect ratio greater than 1000, preferably greater than 5000, more preferably greater than 10 000 and most preferably greater than 50 000. The aspect ratio is defined as the length of the fiber divided by the diameter.

While complying with the above-defined aspect ratio the fibers preferably have a minimum length of 1 m, particularly preferably 50 m and very particularly preferably 100 m. The individual fibers preferably have a diameter of less than 0.1 mm, more preferably less than 0.05 mm, and yet more preferably less than 0.03 mm.

The fibers may be individual fibers but may also have been woven or knitted in any form known to those skilled in the art to afford mats or tiles or may be present as non-crimp fabrics.

The wetting of the fibers may be carried out using any of the methods known to those skilled in the art that enable good wetting of the fiber with the reaction mixture. Without any claim to completeness, these include doctor blades, an immersion bath, an injection box, spraying methods, resin injection methods, resin infusion methods with vacuum or under pressure, an application roll and manual lamination methods.

In a particularly preferred embodiment of the invention, an immersion bath is used. The dried fibers are pulled here through an open resin bath, with deflection of the fibers into and out of the resin bath via guide grids (bath method). Alternatively, the fibers also can be pulled straight through the impregnation device without deflection (pull-through method).

In a further particularly preferred embodiment of the invention, an injection box is used. In the case of the injection box, the fibers are pulled without deflection into the impregnation unit that already has the shape of the later profile. By means of pressure, the reactive resin mixture is pumped into the box, preferably transverse to the fiber direction.

In a further particularly preferred embodiment of the invention, a doctor blade is used. When using the doctor blade, the reactive resin mixture is applied to a carrier paper and the fibers are optionally pulled into the resin mixture.

In a particularly preferred embodiment, the wetted fibers are used to produce a semifinished product. The ratio between the reaction mixture, the fibers to be wetted and all further constituents of the semifinished product is preferably selected such that the fiber content is at least 10% by volume, preferably 20% by volume, more preferably at least 30% by volume, yet more preferably at least 40% by volume and most preferably at least 50% by volume of the ready-to-use semifinished product.

Process for Producing a Semifinished Product

In a further embodiment, the present invention relates to a process for producing a semifinished product containing the steps of a) providing a reaction mixture having a molar ratio of isocyanate groups to isocyanate-reactive groups of 2:1 to 10:1 containing:

(i) a polyisocyanate composition A;

(ii) an isocyanate-reactive component B;

(iii) at least one catalytic functionality C1 which catalyzes the reaction of isocyanate groups with isocyanate-reactive groups to afford urethane groups; and (iv) at least one catalytic functionality C2 which catalyzes the reaction of isocyanate groups to afford isocyanurate groups, wherein the catalytic functionalities C1 and C2 are brought about by the same compound or by at least two different compounds;

and b) crosslinking the polyisocyanate component A and the isocyanate-reactive component B by heating the reaction mixture to a temperature between 10° C. and 50° C.

All definitions of the reaction mixture according to the invention recited further above also apply to this embodiment. However, for the process according to the invention the proportion of cycloaliphatically and aliphatically bonded isocyanate groups based on the total amount of the isocyanate groups contained in the polyisocyanate composition A is not limited as specified hereinabove for the polymerizable composition.

The term "providing" the reaction mixture according to the invention means that the reaction mixture is in ready-to-use form. In principle, all that is required therefor is mixing of its constituents. All methods known to be suitable to those skilled in the art may be used therefor. At the end of the process step the reaction mixture is in a form such that urethanization in process step b) can be commenced by simple heating.

The crosslinking of the polyisocyanate component A and the isocyanate-reactive component B is brought about by temperature-controlling the reaction mixture to a temperature at which the catalytic functionality C1 is already active while the catalytic functionality C2 is substantially inactive. This is the case preferably in the temperature range between 10° C. and 50° C., more preferably between 10° C. and 40° C. This causes the viscosity of the reaction mixture to increase. However, since a large part of the isocyanate groups is still present in free form, the resulting material has not yet reached its ultimate hardness. The resulting semifinished product thus remains deformable.

Process step b) is preferably performed until the reaction mixture achieves a viscosity in mPas determined in a cone-plate rotational viscometer at 23° C. and a shear rate of 1/s of at least 30 000, preferably at least 50 000 mPas and particularly preferably at least 100 000 mPas and very particularly preferably at least 500 000 mPas. In another embodiment, the mixture is preferably stirred until the reaction mixture has a modulus G' determined by a plate/plate rheometer according to ISO 6721-10:2015-09 at 1/s at 23° C. of at least $5*10^3$ Pa. The modulus G' determined at a temperature of 10° C. above the glass transition temperature is at most $5*105$ Pa. The glass transition temperature is determined by differential scanning calorimetry.

The percentage of isocyanate groups still present may be determined by comparison of the content of isocyanate groups in the original polyisocyanate composition A with the content of isocyanate groups in the reaction product, for example by abovementioned comparison of the peak maxima of the isocyanate band at about 2270 cm$^1$ using ATR-spectroscopy.

In a preferred embodiment of the present invention, the reaction mixture provided in process step a) is applied to a fiber before commencement of process step b). This may be carried out using any of the methods known to those skilled in the art.

In a particularly preferred embodiment, the fibers are in the form of a woven fabric, non-crimp fabric or knitted fabric prior to wetting or are combined to form a woven fabric, non-crimp fabric or knitted fabric after wetting but before crosslinking of the polyisocyanate component A with component B.

In a preferred embodiment, the reaction of the functionality B with A is carried out over a period of at most 7 days, preferably at most 3 days and very particularly preferably at most 24 hours at a temperature of preferably between 10° C. and 50° C., more preferably between 10° C. and 40° C. and very particularly preferably between 10° C. and 30° C. up to a degree of conversion at which the viscosity of the formulation has increased to at least 30 000 mPas, preferably at least 50 000 mPas, particularly preferably at least 100 000 mPas and very particularly preferably at least 500 000 mPas. In a further preferred embodiment, at least 30%, preferably at least 50% and very particularly preferably at least 70% of the polyol functionality is converted after incubation over the abovementioned periods at the abovementioned temperatures.

The thus-obtained stable semifinished products may be stored over 7 days, preferably over 30 days and very particularly preferably over 90 days at temperatures of at most 30° C., preferably at most 20° C. and very particularly preferably of at most 10° C. and largely without loss of properties reacted to afford isocyanurate plastics at temperatures of at least 60° C., preferably at least 80° C. and particularly preferably 100° C. This reduces the isocyanate concentration to preferably at most 30%, preferably at most 20% and particularly preferably at most 10% of the starting isocyanate concentration. The reduction is preferably effected through reaction of the isocyanate groups with other isocyanate groups to form isocyanurates.

Semifinished Product

The process according to the invention affords a semifinished product which is storable and transportable. The present invention thus also relates to the semifinished product obtainable by the process according to the invention.

Since the crosslinking of the polyisocyanate component A with the component B does not yet afford materials of great hardness the semifinished product can still be subjected to forming by common processes.

In a preferred embodiment of the present invention, the semifinished product according to the invention is used for production of profiles, beams, reinforcing struts, sporting goods, manhole covers, plates, housings, parcel shelves, engine bay covers, leaf springs, bumpers, trim pieces, aprons, pipes, pressure vessels or tanks. Preferred sporting goods are arrows, sports bows, skis and rackets, especially tennis rackets.

Isocyanurate Plastic

In yet another embodiment, the present invention relates to a process for producing a polyisocyanurate plastic, characterized in that a semifinished product produced by the above-described process is subjected to catalytic trimerization by heating to a temperature of at least 60° C., preferably at least 80° C. and very particularly preferably at least 100° C. To avoid decomposition of the material a temperature of 280° C. is not exceeded.

It is preferable when at least 80% of the free isocyanate groups present in the semifinished product are consumed during the catalytic trimerization.

The term "catalytic trimerization" refers to the crosslinking of at least two, preferably at least three, isocyanate groups with one another. It cannot be ruled out that isocyanate groups also react with any isocyanate-reactive groups still present as a side reaction.

However, it is preferable when at least 50%, preferably at least 60% and most preferably at least 70% of the isocyanate groups crosslinked during the catalytic trimerization are converted into uretdione, isocyanurate, allophanate, biuret, iminooxadiazinedione and/or oxadiazinetrione structures.

It is especially preferable when at least 15% of the isocyanate groups crosslinked during the catalytic trimerization are converted into isocyanurate groups.

In a preferred embodiment of the present invention, the weight ratio of isocyanurate groups to urethane groups after reaction of at least 80% of the isocyanate groups originally present in the reaction mixture at the end of process step a) is in the range between 2:1 and 20:1, preferably between 3:1 and 15:1 and particularly preferably between 5:1 and 10:1.

In a further preferred embodiment of the present invention, the weight fraction of isocyanurate groups based on the total weight of the components a) and b) after reaction of at least 80% of the isocyanate groups originally present in the reaction mixture at the end of process step a) is in the range between 5% by weight and 45% by weight, preferably between 7% by weight and 40% by weight and particularly preferably between 10% by weight and 35% by weight. In this embodiment it is further preferable when the weight fraction of urethane groups based on the total weight of the components a) and b) after reaction of at least 80% of the isocyanate groups originally present in the reaction mixture at the end of process step a) is in the range between 1% by weight and 10% by weight, preferably between 1.5% by weight and 7% by weight and particularly preferably between 2% by weight and 5% by weight.

In a preferred embodiment of the present invention, the production of the isocyanurate plastic from the semifinished product is carried out at least 10 m, more preferably at least 50 m, yet more preferably at least 500 m and most preferably at least 2000 m from the location at which the semifinished product according to the invention was produced.

In yet another preferred embodiment, the semifinished product from which the isocyanurate plastic according to the invention is produced by catalytic trimerization is subjected to forming before the process step of catalytic trimerization. This is preferably effected by bending or pressing.

In a further preferred embodiment, the present invention relates to an isocyanurate plastic obtainable by the above-described process.

This isocyanurate plastic is preferably a composite material containing at least 10% by volume, more preferably at least 20% by volume and yet more preferably at least 30% by volume of fibers D.

The working examples which follow serve merely to illustrate the invention. They are not intended to limit the scope of protection of the claims in any way.

WORKING EXAMPLES

General Information:

Unless otherwise stated all reported percentage values are in percent by weight (% by weight).

The ambient temperature of 23° C. at the time of performing the experiments is referred to as RT (room temperature).

The methods specified hereinbelow for determining the corresponding parameters were used for performing and evaluating the examples and are also the methods for determining the parameters relevant according to the invention in general.

Determination of Phase Transitions by DSC

The phase transitions were determined by means of DSC (differential scanning calorimetry) with a Mettler DSC 12E (Mettler Toledo GmbH, Giessen, Germany) in accordance with DIN EN 61006. Calibration was effected via the melt onset temperature of indium and lead. 10 mg of substance were weighed out in standard capsules. The measurement was effected by three heating runs from −50° C. to +200° C. at a heating rate of 20 K/min with subsequent cooling at a cooling rate of 320 K/min. Cooling was effected by means of liquid nitrogen. The purge gas used was nitrogen. The values reported are in each case based on evaluation of the 2nd heating curve. The glass transition temperature $T_g$ was obtained from the temperature at half the height of a glass transition step.

Determination of Infrared Spectra

The infrared spectra were measured on a Bruker FT-IR spectrometer equipped with an ATR unit.

Determination of Viscosity

The viscosity of a small amount of the reactive resin mixture (including the added catalyst) was measured at 23° C. with a Physica MCR 51 instrument from Anton Paar (plate/plate; shear rate 1 s$^{-1}$).

Starting Compounds

Polyisocyanate A1 is an HDI trimer (NCO functionality >3) having an NCO content of 23.0% by weight from Covestro AG. It has a viscosity of about 1200 mPa·s at 23° C. (DIN EN ISO 3219/A.3).

Polyisocyanate A2 is a PDI trimer (NCO functionality >3) having an NCO content of 21.5% by weight from Covestro AG. It has a viscosity of about 9500 mPa·s at 23° C. (DIN EN ISO 3219/A.3).

Polyisocyanate A3 is an HDI/IPDI polyisocyanate having an NCO content of 21.0% by weight from Covestro AG. It has a viscosity of about 22 500 mPa·s at 23° C. (DIN EN ISO 3219/A.3).

Potassium acetate was obtained in a purity of >99% by weight from ACROS.

Polyethylene glycol (PEG) 400 was obtained in a purity of >99% by weight from ACROS.

Glycerol was obtained in a purity of >99% by weight from ACROS.

Dibutyltin dilaurate (DBTL) was obtained in a purity of 95% by weight from Sigma-Aldrich.

Catalyst K1:

N,N,N'-Trimethylaminoethylethanolamine having an OH number of 384 mg KOH/g was obtained from Huntsman Corporation.

All raw materials except for the catalyst were degassed under reduced pressure prior to use, and the polyethylene glycol was additionally dried.

Production of Catalyst K2:

The N,N,N'-trimethylaminoethylethanolamine (14.6 g) was added dropwise to the isocyanate A1 (18.3 g) with cooling and stirred until the mixture was homogeneous.

Production of Catalyst K3:

Potassium acetate (5.0 g) was stirred in the PEG 400 (95.0 g) at RT until all of it had dissolved. This afforded a 5% by weight solution of potassium acetate in PEG 400 which was used as catalyst without further treatment.

Production of Catalyst K4:

5 g of DBTL were added to 495 g of polyisocyanate A1 and dissolved with stirring. This afforded a 1% strength catalyst solution which was used for producing the reaction mixtures without further treatment.

Production of the Reaction Mixture

Unless otherwise stated production of the reaction mixture comprised initially producing the isocyanate composition by mixing the appropriate isocyanate components (A1, A2 or A3) with an appropriate amount of catalyst (K1-K4) and glycerol at 23° C. in a Speedmixer DAC 150.1 FVZ from Hauschild for 120 seconds at 1500 min$^{-1}$.

The mixture was then placed in a mold (metal lid, approx. 6 cm in diameter and approx. 1 cm in height) and stored at RT for 24 h. This was followed by post-curing in an oven.

Working Examples 1-39

The amounts of polyisocyanate A1, A2 or A3, glycerol and catalyst K1-K4 specified in Table 1 were treated according to the abovementioned production specification for reaction mixtures. This was followed by curing in an oven under the conditions specified in Table 1.

The viscosity of the reaction mixtures increased during the RT pre-curing and the material became highly viscous to The viscosity of the reaction mixtures increased insignificantly during the RT pre-curing and remained below 10 000 mPas. If the material was cured after oven curing the Tg of the cured reaction mixtures was between 81° C. and 102° C.

TABLE 1

Compositions, production conditions and material properties of the working and comparative examples.

| Ex. | Poly-isocyanate | Amount of polyisocyanate [g] | Amount of polyol [g] | Index | Cat. | Amount [g] | 2nd cat. | Amount [g] | Appearance before oven curing | Oven curing conditions | Appearance after oven curing | Tg after curing [° C.] |
|---|---|---|---|---|---|---|---|---|---|---|---|---|
| 1 (inv.) | A1 | 200 | 16.78 | 200 | K3 | 4.17 | K4 | 4.87 | Elastic, dry | 120° C., 15 min | Solid | 98 |
| 2 (inv.) | A1 | 200 | 16.78 | 200 | K3 | 4.17 | K4 | 4.87 | Elastic, dry | 200° C., 5 min | Solid | 98 |
| 3 (inv.) | A1 | 400 | 16.78 | 400 | K3 | 12.51 | K4 | 4.87 | Elastic, dry | 120° C., 15 min | Solid | 98 |
| 4 (inv.) | A1 | 400 | 16.78 | 400 | K3 | 12.51 | K4 | 4.87 | Elastic, dry | 200° C., 5 min | Solid | 100 |
| 5 (inv.) | A1 | 600 | 16.78 | 600 | K3 | 20.85 | K4 | 7.01 | High viscosity liquid | 120° C., 30 min | Solid | 103 |
| 6 (inv.) | A1 | 800 | 16.78 | 600 | K3 | 20.55 | K4 | 7.01 | High viscosity liquid | 200° C., 5 min | Solid | 101 |
| 7 (inv.) | A1 | 200 | 16.78 | 200 | K1 | 0.25 | K4 | 4.87 | Elastic, dry | 120° C., 15 min | Solid | 102 |
| 8 (inv.) | A1 | 200 | 16.78 | 200 | K1 | 0.50 | — | — | Elastic, dry | 120° C., 15 min | Solid | 98 |
| 9 (inv.) | A1 | 200 | 16.78 | 200 | K1 | 0.50 | — | — | Elastic, dry | 200° C., 5 min | Solid | 100 |
| 10 (inv.) | A1 | 400 | 16.78 | 400 | K1 | 1.00 | — | — | Gel | 120° C., 15 min | Solid | 108 |
| 11 (inv.) | A1 | 400 | 16.78 | 400 | K1 | 1.00 | — | — | Gel | 200° C., 5 min | Solid | 108 |
| 12 (inv.) | A1 | 600 | 16.78 | 600 | K1 | 1.5 | — | — | High viscosity liquid | 120° C., 15 min | Solid | 112 |
| 13 (inv.) | A1 | 600 | 16.78 | 600 | K1 | 1.5 | — | — | High viscosity liquid | 200° C., 5 min | Solid | 84 |
| 14 (inv.) | A1 | 200 | 16.78 | 200 | K2 | 0.5 | K4 | 4.67 | Elastic, dry | 200° C., 5 min | Solid | 106 |
| 15 (inv.) | A1 | 200 | 16.78 | 200 | K2 | 1.0 | — | — | High viscosity liquid | 200° C., 5 min | Solid | 93 |
| 16 (inv.) | A1 | 400 | 16.78 | 400 | K2 | 2.0 | — | — | High viscosity liquid | 200° C., 5 min | Solid | 92 |
| 17 (inv.) | A1 | 200 | 16.78 | 200 | K2 | 1.0 | — | — | High viscosity liquid | 120° C., 30 min | Solid | 93 |
| 18 (inv.) | A1 | 400 | 16.78 | 400 | K2 | 2.0 | — | — | High viscosity liquid | 120° C., 30 min | Solid | 92 |
| 19 (inv.) | A3 | 200 | 15.35 | 200 | K3 | 4.00 | K4 | 4.61 | Elastic, dry | 200° C., 5 min | Solid | 136 |
| 20 (inv.) | A3 | 200 | 15.35 | 200 | K1 | 0.25 | K4 | 4.61 | Elastic, dry | 200° C., 5 min | Solid | 142 |
| 21 (inv.) | A3 | 200 | 15.35 | 200 | K1 | 0.5 | — | — | Elastic, dry | 200° C., 5 min | Solid | 143 |
| 22 (inv.) | A3 | 400 | 15.35 | 400 | K3 | 12.00 | K4 | 4.61 | Elastic, dry | 200° C., 5 min | Solid | 146 |
| 23 (inv.) | A3 | 400 | 15.35 | 400 | K1 | 1.0 | — | — | Elastic, dry | 200° C., 5 min | Solid | 129 |
| 24 (inv.) | A2 | 200 | 15.74 | 200 | K3 | 4.00 | K4 | 4.63 | Elastic, dry | 200° C., 5 min | Solid | 109 |
| 25 (inv.) | A2 | 200 | 15.74 | 200 | K1 | 0.5 | — | — | Elastic, dry | 200° C., 5 min | Solid | 111 |
| 26 (inv.) | A2 | 400 | 15.74 | 400 | K3 | 12.00 | K4 | 4.63 | Elastic, dry | 200° C., 5 min | Solid | 111 |
| 27 (inv.) | A2 | 400 | 15.74 | 400 | K1 | 1.0 | — | — | High viscosity liquid | 200° C., 5 min | Solid | 119 |
| 28 (inv.) | A2 | 200 | 15.74 | 200 | K2 | 0.5 | K4 | 4.63 | Elastic, dry | 200° C., 5 min | Solid | 116 |
| 29 (inv.) | A2 | 200 | 15.74 | 200 | K2 | 1.0 | K4 | 4.63 | High viscosity liquid | 200° C., 5 min | Solid | 115 |
| 30 (comp.) | A1 | 200 | 16.78 | 200 | K3 | 8.34 | — | — | Low viscosity liquid | 120° C., 15 min | Solid | 85 |
| 31 (comp.) | A1 | 200 | 16.78 | 200 | K3 | 8.34 | — | — | Low viscosity liquid | 120° C., 30 min | Solid | 81 |
| 32 (comp.) | A1 | 200 | 16.78 | 200 | K3 | 8.34 | — | — | Low viscosity liquid | 200° C., 5 min | Solid | 85 |
| 33 (comp.) | A1 | 200 | 16.78 | 200 | K3 | 8.34 | — | — | Low viscosity liquid | 200° C., 10 min | Solid | 88 |
| 34 (comp.) | A1 | 400 | 16.78 | 400 | K3 | 16.68 | — | — | Low viscosity liquid | 120° C., 15 min | Solid | — |
| 35 (comp.) | A1 | 400 | 16.78 | 400 | K3 | 16.68 | — | — | Low viscosity liquid | 120° C., 30 min | Solid | — |
| 36 (comp.) | A1 | 400 | 16.78 | 400 | K3 | 16.68 | — | — | Low viscosity liquid | 200° C., 5 min | Solid | 97 |
| 37 (comp.) | A1 | 600 | 16.78 | 600 | K3 | 25.02 | — | — | Low viscosity liquid | 120° C., 15 min | Solid | — |
| 38 (comp.) | A1 | 600 | 16.78 | 600 | K3 | 25.02 | — | — | Low viscosity liquid | 120° C., 30 min | Solid | — |
| 39 (comp.) | A1 | 600 | 16.78 | 600 | K3 | 25.02 | — | — | Low viscosity liquid | 200° C., 5 min | Solid | 102 |
| 40 (comp.) | A1 | 600 | 16.78 | 600 | K3 | 25.02 | — | — | Low viscosity liquid | 200° C., 10 min | Solid | 95 | elastic and dry. The RT pre-curing caused the characteristic NCO band between 2300 and 2250 $cm^{-1}$ to be reduced in height but an NCO content of >5% based on the initial amount was still detectable in each case.

The Tg of the hardened reaction mixtures were between 83° C. and 146° C. The thermal curing caused the characteristic NCO band between 2300 and 2250 $cm^{-1}$ to be reduced in height by at least 80%.

Comparative Examples 30-40

The amounts of polyisocyanate A1, glycerol and catalyst K3 specified in Table 1 were treated according to the abovementioned production specification for reaction mixtures. This was followed by curing in an oven under the conditions specified in Table 1.

Production of a Composite

Working Example 41

200 g of polyisocyanate A3, 4.000 g of catalyst K3, 4.61 g of catalyst K4 and 15.35 g of glycerol were treated according to the abovementioned production specification for reaction mixtures. To produce a composite the previously produced reaction mixture was doctor-coated onto a Teflon film in a thickness of 100 μm. A glass fiber mat was then placed in the reaction mixture and a further Teflon film placed on top. The film sandwich was rolled with a roller and then stored at RT for 24 h. The semifinished product was found to be elastic, dry and uniformly saturated. The film sandwich was then post-cured for 5 min at 200° C.

The $T_g$ after oven curing is 129° C. The thermal curing caused the characteristic NCO band between 2300 and 2250 cm$^{-1}$ to be reduced in height by at least 80%.

The invention claimed is:

1. A reaction mixture having a molar ratio of isocyanate groups to isocyanate-reactive groups of 2:1 to 10:1 comprising
   a) a polyisocyanate composition A having a proportion of aliphatically and/or cycloaliphatically bonded isocyanate groups based on a total amount of isocyanate groups present of at least 80 mol %;
   b) an isocyanate-reactive component B;
   c) at least one catalytic functionality C1 which catalyzes a reaction of isocyanate groups with isocyanate-reactive groups to afford urethane and/or urea groups; and
   d) at least one catalytic functionality C2 which catalyzes a reaction of isocyanate groups to afford isocyanurate groups,
   wherein the catalytic functionalities C1 and C2 are brought about by the same compound or by at least two different compounds and a type and amount of the catalytic functionalities C1 and C2 is such that in a temperature range between 10° C. and 50° C. the reaction of isocyanate groups to afford urethane and/or urea groups proceeds at least twice as fast as all other reactions in which isocyanate groups are consumed in the reaction mixture.

2. The reaction mixture as claimed in claim 1, wherein the catalytic functionality C1 has a reaction rate coefficient for the reaction of isocyanate groups $k(T)_{ISOC1}$ at temperatures of at most 50° C. which is larger than a reaction rate coefficient $k(T)_{ISOC2}$ of the catalytic functionality C2 by at least a factor of 2.

3. The reaction mixture as claimed in claim 1, wherein the isocyanate-reactive component B has a number-average molecular weight of at most 21 000 g/mol.

4. The reaction mixture as claimed in claim 1, wherein the isocyanate-reactive component B on average has an OH number between 100 and 2000 mg KOH/g.

5. The reaction mixture as claimed in claim 1, wherein a proportion of physical and chemical blowing agents in the reaction mixture is at most 1% by weight based on a total weight of the reaction mixture.

6. The reaction mixture as claimed in claim 1, wherein the reaction mixture has a pot life of at least 5 minutes, wherein the pot life is defined as the time elapsed until doubling of the viscosity of the reaction mixture at a temperature of 23° C.

7. A fiber D wetted with the reaction mixture as claimed in claim 1.

8. A process for producing a semifinished product containing
   a) providing a reaction mixture having a molar ratio of isocyanate groups to isocyanate-reactive groups of 2:1 to 10:1 comprising:
      (i) a polyisocyanate composition A;
      (ii) an isocyanate-reactive component B;
      (iii) at least one catalytic functionality C1 which catalyzes a reaction of isocyanate groups with isocyanate-reactive groups to afford urethane and/or urea groups; and
      (iv) at least one catalytic functionality C2 which catalyzes a reaction of isocyanate groups to afford isocyanurate groups,
      wherein the catalytic functionalities C1 and C2 are brought about by the same compound or by at least two different compounds;
   and
   b) crosslinking the polyisocyanate component A and the isocyanate-reactive component B by temperature-controlling the reaction mixture to a temperature between 10° C. and 50° C.

9. The process as claimed in claim 8, wherein after performance of process step b) the reaction mixture has a modulus G' of at least 1*10$^4$ Pa as determined by a plate/plate rheometer according to ISO 6721-10:2015-09 at 1/s at 23° C.

10. The process as claimed in claim 8, wherein the reaction mixture provided in process step a) is applied to a fiber before performance of process step b).

11. A semifinished product obtained by the process as claimed in claim 8.

12. A method of producing a product, comprising producing the product, at least in part, with the semifinished product as claimed in claim 11, wherein the product comprises profiles, beams, reinforcing struts, sporting goods, manhole covers, plates, housings, parcel shelves, engine bay covers, leaf springs, bumpers, trim pieces, aprons, pipes, pressure vessels, or tanks.

13. A process for producing a polyisocyanurate plastic, wherein a semifinished product produced by a process as claimed in claim 8 is subjected to catalytic trimerization by heating to a temperature of at least 60° C.

14. The process as claimed in claim 13, wherein the catalytic trimerization is performed at a location at least 10 m away from a location at which urethanization to produce the semifinished product is carried out.

15. The process as claimed in claim 13, wherein at least 80% of free isocyanate groups present in the semifinished product are consumed during the catalytic trimerization.

16. A polyisocyanurate plastic obtainable by the process as claimed in claim 13.

* * * * *